J. H. WHITING.
ENGINE GOVERNOR.
APPLICATION FILED DEC. 28, 1911.

1,070,646.

Patented Aug. 19, 1913.
4 SHEETS—SHEET 1.

J. H. WHITING.
ENGINE GOVERNOR.
APPLICATION FILED DEC. 28, 1911.
1,070,646.
Patented Aug. 19, 1913.
4 SHEETS—SHEET 2.
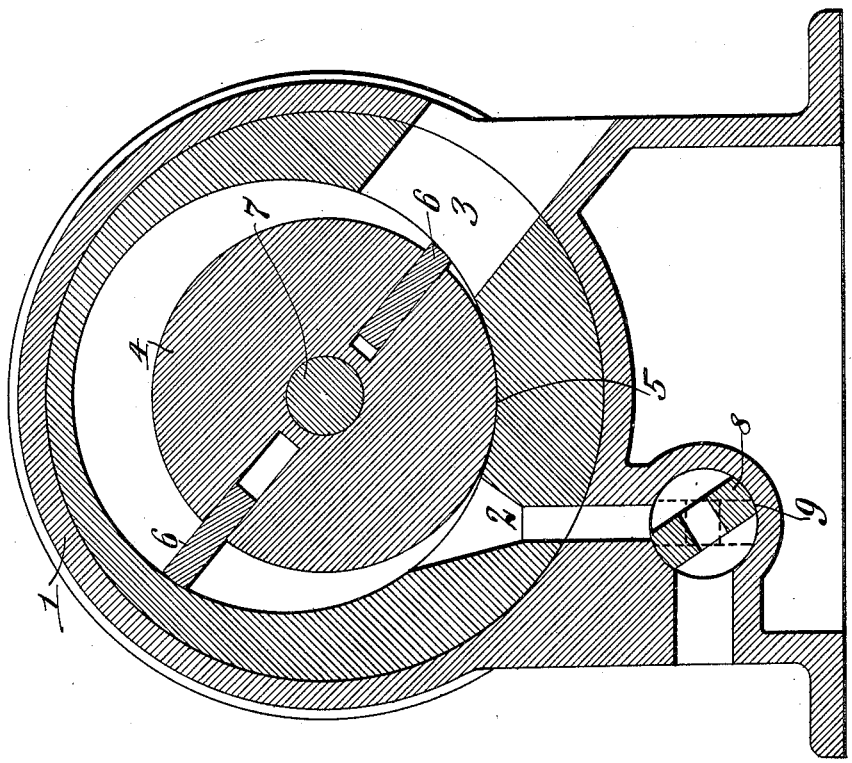
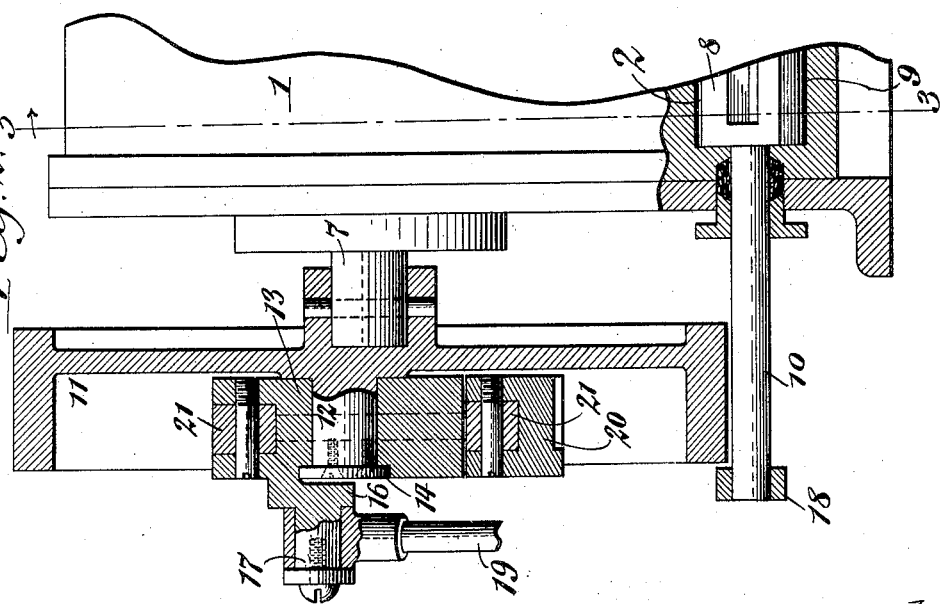

J. H. WHITING.
ENGINE GOVERNOR.
APPLICATION FILED DEC. 28, 1911.

1,070,646.

Patented Aug. 19, 1913.
4 SHEETS—SHEET 3.

Witnesses:—
Leroy S. Hodges
Anna Hugie

Inventor
John H. Whiting
by Geyer & Popp
Attorneys

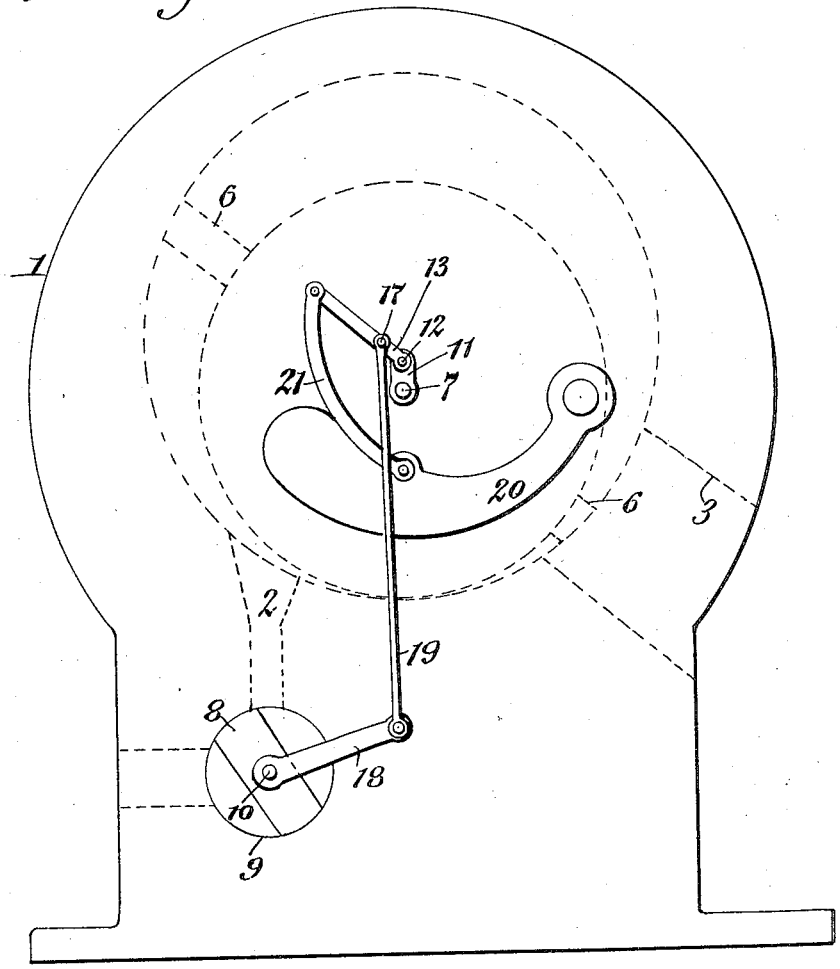

UNITED STATES PATENT OFFICE.

JOHN H. WHITING, OF BUFFALO, NEW YORK.

ENGINE-GOVERNOR.

1,070,646.   Specification of Letters Patent.   Patented Aug. 19, 1913.

Application filed December 28, 1911. Serial No. 668,235.

*To all whom it may concern:*

Be it known that I, JOHN H. WHITING, a citizen of the United States, residing at Buffalo, in the county of Erie and State of New York, have invented new and useful Improvements in Engine-Governors, of which the following is a specification.

This invention relates to a governor which is more particularly designed for rotary steam engines but which may also be used to advantage in other types of engines and also in engines which are actuated by other motive agents. In the governors heretofore in use for engines of this character the steam valve has been so actuated that when the speed of the engine increased a cut off action is produced both at the opening and closing ends of the movement of the steam valve. In other words the inlet valve, in the case of a steam engine, was not opened by the governor until the piston had effected the initial part of a working stroke and was closed before the piston completed this stroke. This is objectionable because the delaying of the admission of steam to the cylinder after the normal period of steam intake causes the pistons to make a partial idle movement, whereby the full working efficiency of the steam is not obtained and the power output of the engine is correspondingly reduced.

It is the object of this invention to provide a governor for rotary and other engines in which the valve is so operated that no cut off of steam occurs at the beginning of the stroke of a piston and all the cutting off is effected during the last part of the stroke of the piston both when running at slow or high speeds, whereby the pressure of the steam is utilized to better advantage for developing power, and greater economy in fuel consumption is effected.

Figure 1:
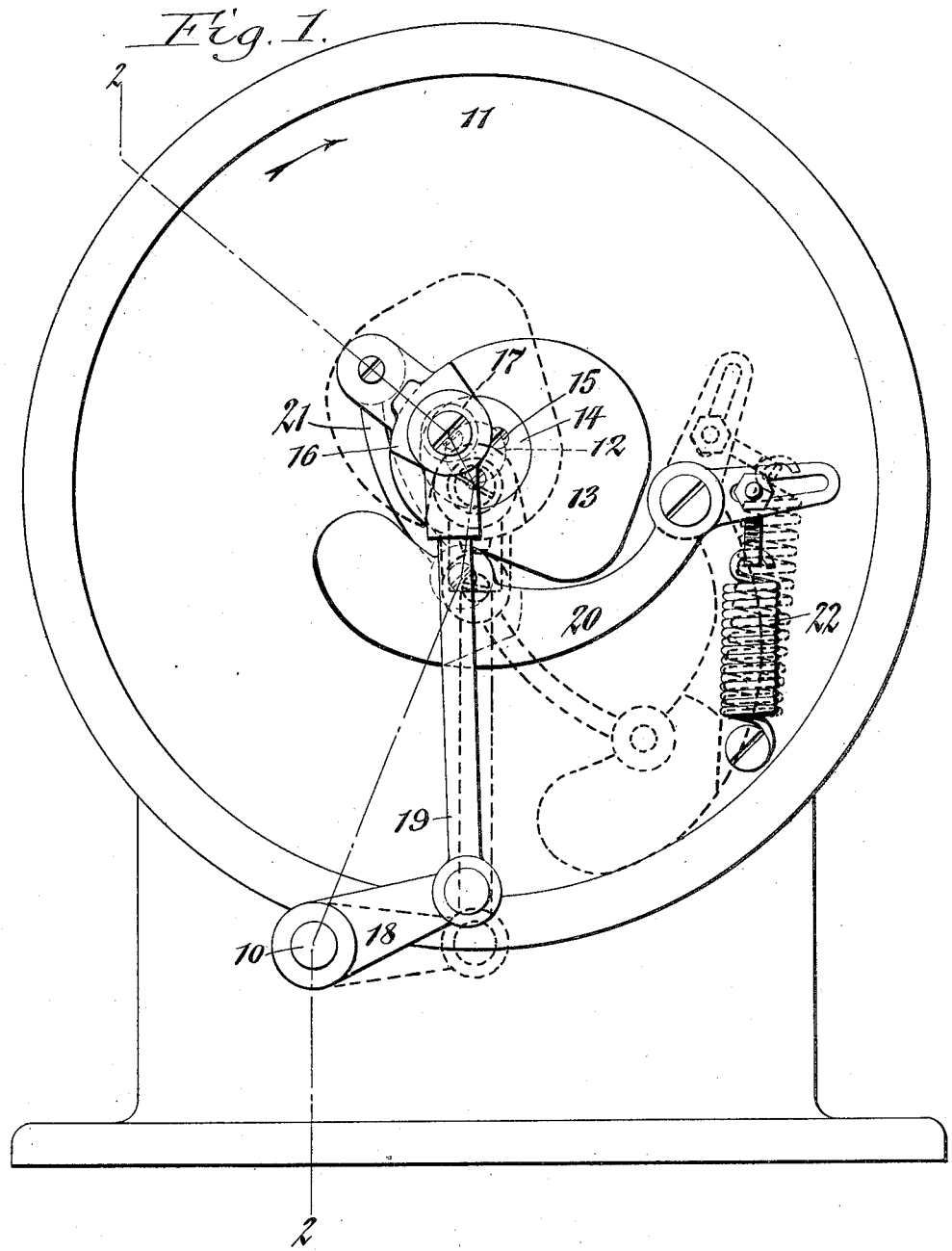
Figure 6:
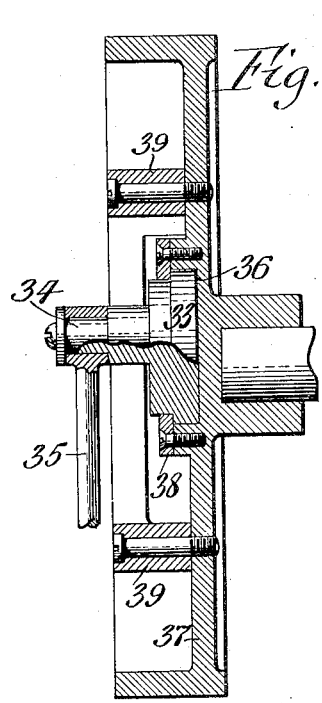
Figure 7:
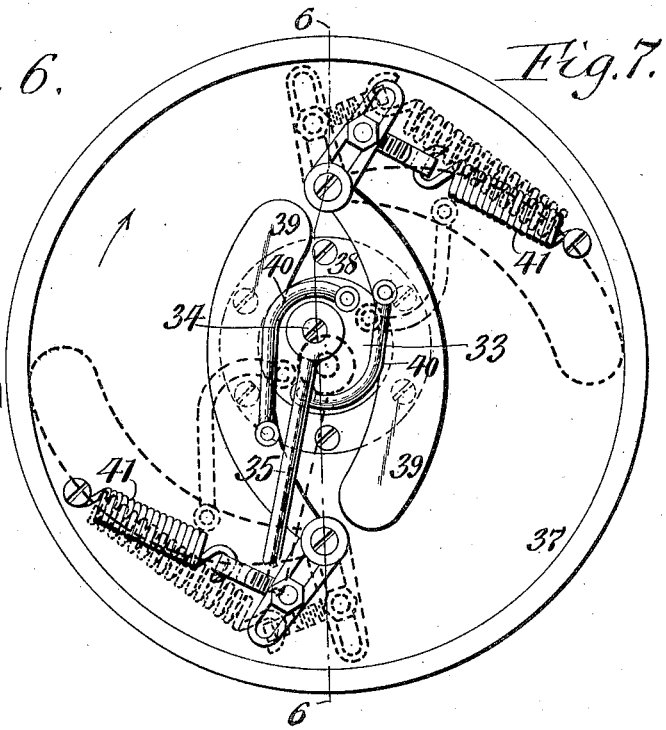
Figure 4:
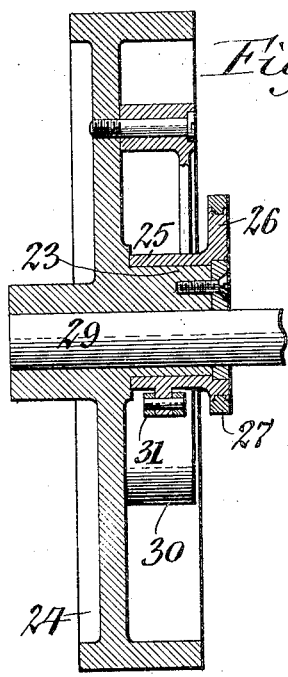
Figure 5:
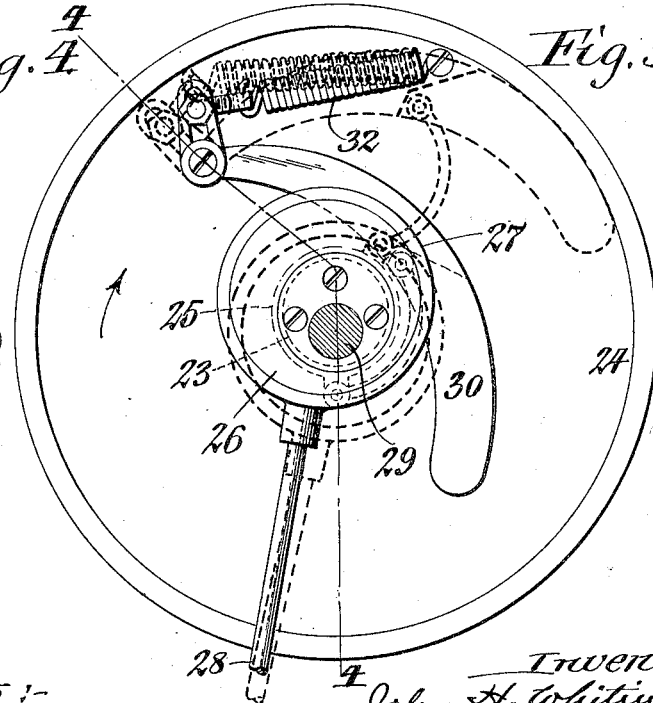

In the accompanying drawings consisting of 4 sheets: Figure 1 is an end elevation of my improved governor applied to a rotary engine. Fig. 2 is a vertical transverse section thereof taken in line 2—2, Fig. 1, and showing the main elements of a rotary engine which are associated with the governor. Fig. 3 is a vertical transverse section taken in line 3—3, Fig. 2, looking in the direction of the arrow associated with this line. Fig. 4 is a vertical longitudinal section showing a modified form of governor embodying my invention, the section being taken in line 4—4, Fig. 5. Fig. 5 is a vertical transverse section taken in line 5—5, Fig. 4. Fig. 6 is a vertical longitudinal section showing another modification of my invention and taken in line 6—6, Fig. 7. Fig. 7 is an end elevation of the construction shown in the last mentioned figure. Fig. 8 is a diagrammatic view of the engine governor.

Similar characters of reference indicate corresponding parts throughout the several views.

Although my improved governor is applicable to various kinds of engines operated either by steam or other actuating medium the same is shown in the drawings in connection with a rotary steam engine which comprises a horizontal steam cylinder 1 provided in its side at different points of its periphery with the steam inlet port or passage 2 and a steam outlet port or exhaust passage 3, a rotary piston carrier 4 of cylindrical form arranged eccentrically within the cylinder so as to engage at one side with an abutment 5 formed on one side of the cylinder but separated therefrom at all other points, radially movable pistons or piston wings 6 guided in suitable ways on the piston carrier and engaging with the bore of the cylinder, a horizontal power or driving shaft 7 upon which the piston carrier is mounted and which is journaled in suitable bearings on the heads of the cylinder, an oscillating steam inlet valve 8 arranged within a cylindrical seat 9 formed in the steam inlet port or passage, and a valve shaft 10 connected with the steam valve and arranged parallel with the power shaft 7.

The steam valve is operated by motion derived from the main shaft in such manner that the valve moves in one direction and uncovers the steam port just after one of the piston wings has passed beyond the delivery end of the steam port, then closes the valve during the last part of the stroke of the piston and then again opens the valve when the other piston has passed from the abutment to a point beyond the delivery end of the steam port, this operation being well known in this type of engines.

My improved governor which operates the steam valve is constructed as follows: Referring to Figs. 1–3, 11 represents a rotatable support mounted on the outer end of the engine shaft 7 this support in the present instance being constructed in the shape of a fly wheel which operates to carry the engine over the dead center in the direction of the arrow in Fig. 1. On its outer side this fly wheel is provided with a primary crank bearing journal or pin 12, the axis of which is arranged on one side of the axis of the main shaft and fly wheel but parallel therewith. That portion of the fly wheel adjacent to the driving shaft and primary crank journal forms a primary crank arm which connects this shaft and crank journal. On this primary crank journal or pin is mounted a secondary crank arm or collar 13 which is capable of turning on this pin but held against axial movement relatively thereto by engaging its inner side with the web of the wheel and its outer side with a retaining disk 14 which is secured to the outer end of the primary crank pin by means of screws 15, as shown in Figs. 1 and 2, or by any other suitable means. 16 represents a bracket arranged on the outer side of the secondary crank arm or collar 13 and overhanging the outer end of the primary crank pin and provided with a secondary crank bearing journal or pin 17 the axis of which is arranged on one side of but parallel with the axis of the pivotal connection between the secondary crank arm or collar 13 and the crank pin 12 of the wheel which turns with the main shaft. The distance from the axis of the main shaft and wheel to the axis of the pivotal connection between the wheel and the secondary crank arm or collar 13 is the same as the distance from the axis of this pivotal connection to the axis of the secondary crank journal or pin 17. It follows from this construction that by turning the secondary crank arm or collar 13 outwardly on the primary crank pin 12 that the secondary crank pin 17 will be carried away from the axis of the main shaft and wheel and thereby produce a crank effect upon anything which is connected with the secondary crank pin, while upon turning the secondary crank arm or collar 13 inwardly the axis of the secondary crank pin 17 may be brought to coincide with the axis of the main shaft so that the secondary crank pin is perfectly neutral and any parts connected therewith will in this position of this pin be held at rest, notwithstanding the rotation of the main shaft and associated parts. The secondary crank pin 17 is operatively connected with the steam valve by means of a rock arm 18 secured to the outer end of the valve shaft, and a pitman or connecting rod 19 pivotally connected at its lower end with the valve rock arm while its opposite end is pivotally mounted on the secondary crank pin. The secondary crank arm or collar 13 is moved in the direction for carrying the secondary crank pin 17 toward the axis of the main shaft by means of a governor weight lever 20 which is pivoted on the adjacent outer side of the fly wheel and connected by a link 21 with the crank collar 13 and the reverse movement of the latter for causing the secondary crank pin 17 to move away from the axis of the main shaft is produced by means of a spring 22 connecting the governor weight lever with the adjacent part of the fly wheel.

Upon starting the engine the weight lever 20 is moved into its innermost position by means of the spring 22 and the secondary crank pin 17 is arranged farthest from the axis of the main shaft, whereby the maximum throw of the secondary crank 17 is obtained and the steam valve is rocked the greatest distance alternately in opposite directions from its central position, and steam is admitted for the longest period of time into the cylinder after each piston wing passes beyond the delivery end of the steam port.

As the speed of the engine increases the weight lever 20 is thrown outwardly by centrifugal force and causes the secondary crank arm or collar 13 to turn in a direction opposite to that of the main shaft and fly wheel, whereby the secondary crank pin 17 is moved toward the axis of the main shaft, thereby reducing the throw of this crank and also reducing the extent of movement of the steam valve from opposite sides of its central position, whereby the admission of steam is correspondingly cut off from the cylinder before the piston wings reach the end of their strokes. Inasmuch, however, as the secondary crank pin 17 during this cutting off operation approaches the axis of the main shaft on a curved line which is concentric with the axis of the primary crank the steam valve is always in its central position at the beginning of the stroke of one or the other of the piston wings and this valve will always be open at the beginning of the stroke of a piston wing so as to enable the steam which is admitted to operate effectively and promptly on the piston wings before they have effected any portion of an idle movement. Furthermore, by mounting the secondary crank pin in the manner indicated the arc through which the steam valve oscillates is cut off at both ends when the engine gathers speed but the time at which the valve is in its central position always remains the same, thereby causing the steam to be cut off only at the tail end of the stroke of each piston wing for the purpose of reducing the speed of the engine, without, however, at this time effecting an unnecessary steam consumption or expending steam from which no power is derived.

When the speed of the engine rises above the normal the secondary crank pin is moved by the action of the centrifugal weight lever into a position in which its axis is in line with the axis of the main shaft of the fly wheel, at which time the secondary crank pin is neutral and the rocking steam valve is held in its central position indicated by dotted lines in Fig. 3 in which steam is cut off from the supply or inlet port and neither of the pistons takes steam after passing the delivery end of the steam port. As soon, however, as the speed of the engine is again reduced by the shutting off of the steam supply the secondary crank pin 17 again moves on a curved line away from the axis of the main shaft, thereby causing the steam valve to again be oscillated and move alternately away from one side and then away from the other side of the steam port in the cylinder to admit steam to the latter as the piston wings successively pass beyond the steam port. By thus admitting the steam always at the beginning of the stroke of each piston wing and effecting the regulation of the steam supply by cutting off the admission of steam at the tail end of the stroke of these pistons, a considerable economy in the use of the steam is effected, as well as a corresponding saving in the consumption of fuel which is an important item where considerable power is required.

In governor mechanisms of this character as heretofore constructed the throw of the secondary crank pin was the same or less than the throw of the governor weight arm or lever. This is objectionable because the movement capable of being imparted to the steam valve by this means necessitated cutting off communication between the cylinder and the steam inlet at the beginning as well as at the end of the stroke of each wing with the result that the initial part of the stroke of the wing produced a partial vacuum behind the wing up to the time of the admission of the steam, thereby producing a back pressure or retarding effect on the engine and reducing the output or efficiency of the engine accordingly. In the present construction the throw of the weight arm or lever is multiplied as it is transmitted to the secondary crank arm and crank pin so that the latter moves through a longer or greater arc while the governor weight arm moves through a shorter or smaller arc. A much longer range of regulating movement is thus obtained by this organization which permits of so timing the valve that the same always closes the steam port at the time that a wing or piston is over this port or in line therewith and then immediately begins to open the steam port after the wing has passed the same, thereby preventing a retarding action at this time and enabling the full pressure of the steam to be immediately utilized upon entering the cylinder behind the wing. The cutting off of the steam supply is always and wholly effected at the tail end or last part of the stroke of the wing so that the steam is permitted to operate expansively upon the wing thereafter. This manner of operating the steam valve is possible owing to the greater length of arc through which the secondary crank pin is moved while the weight lever is swinging through an arc of less length, this increased throw of the secondary crank being due to the fact that the distance from the center of the primary crank pin 12 to the center of the secondary crank pin 17 is less than the distance from the axis of the weight lever 20 on the wheel 11 to the axis of the pivotal connection between the weight lever and the secondary crank arm or collar 13, as clearly shown in the diagrammatic Fig. 8. In the present organization the secondary crank arm moves through an arc of approximately 90 degrees while in engine governors of this character as heretofore constructed the movement of the secondary crank arm has been approximately 15 degrees.

In the construction of the governor represented in Figs. 1, 2 and 3 the governor mechanism is applied to the outer side of the fly wheel. If desired, the governor mechanism may also be organized so as to be capable of application to the inner side of the fly wheel, as shown in Figs. 4 and 5. In this last mentioned construction the primary crank pin 23 is mounted on the inner side of the fly wheel 24 and is considerably larger in diameter than that shown in Fig. 2 so as to permit of embracing the adjacent part of the main shaft. The crank collar 25 in the construction shown in Figs. 4 and 5 is, however, made somewhat smaller than the corresponding collar in Fig. 2 and is mounted on the enlarged primary crank pin 23. At its inner end the crank collar 25 is provided with an enlarged eccentric or secondary crank 26 which has its axis at one side of the axis of the primary crank 23 and its periphery is embraced by an eccentric strap 27 which is connected to a rod 28 adapted to operate the valve rock arm as in the construction shown in Figs. 1–3. The distance from the axis of the secondary crank 26 to the axis of the primary crank 23 is the same as the distance from the axis of the primary crank 23 to the axis of the main shaft 29 which carries the fly wheel 24, so that the regulating effect of these parts upon the steam valve is the same as in the construction shown in Figs. 1–3. The inward movement of the secondary crank 26 in a curved line toward the axis of the main shaft 29 is produced by means of a weight governor lever 30 pivoted on the fly wheel 24 and connected by means of a link 31 with the crank collar 25, and the movement of this secondary crank away from the axis of the main shaft is effected by means of a spring 32 connecting the weight lever with the fly wheel 24.

Instead of effecting the pivotal connection between the fly wheel and the crank collar which carries the secondary crank by means of a primary crank entering an opening in the crank collar, as shown in Figs. 1–5, the same effect can be produced by reversing this pivotal connection between the crank collar and the fly wheel, as shown in Figs. 6 and 7. In this last mentioned construction a crank collar or disk 33 carries the secondary crank pin 34 to which the valve actuating rod 35 is pivoted and this disk is rotatively mounted in a circular socket or bearing 36 which is arranged on the outer side of the fly wheel 37 and in which the crank disk is retained by means of a retaining ring 38 engaging with the outer side of the crank disk 33 and secured to the adjacent part of the fly wheel. In this arrangement the axis of the crank disk is also on one side of the axis of the main shaft and the distance from the axis of this crank disk to the axis of the main shaft is the same as the distance from the crank disk to the axis of the secondary crank.

Instead of employing but a single governor lever, as shown in Figs. 1–5, two of such levers 39, as shown in Fig. 7, may be mounted on the fly wheel on opposite sides of the axis of the main shaft and each connected by means of a link 40 with the crank disk and also with a spring 41 mounted on the wheel for yieldingly holding the lever in its innermost position.

I claim as my invention:

1. In an engine governor, the combination of a rotary driving shaft, a primary bearing mounted on the driving shaft and having its axis arranged on one side of the axis of said shaft, a secondary bearing pivotally mounted on said primary bearing and having its axis arranged on one side of the axis of the primary bearing, a valve, a connection between said valve and secondary bearing, a governor weight pivotally mounted on said shaft, and means operatively connecting said secondary bearing and governor weight and constructed to swing the secondary bearing on the primary bearing through a longer or greater arc than said governor weight.

2. In an engine governor, the combination of a rotary driving shaft, a primary arm connected with said shaft, a primary crank journal mounted on said primary arm on one side of the center of said shaft, a secondary arm pivoted on said primary crank journal, a secondary crank journal mounted on the secondary arm and capable of swinging laterally toward and from the axis of said shaft, a valve, a connection between said valve and said secondary crank journal, a governor weight arm pivotally mounted on said shaft on one side of the axis of the latter, and means connecting said governor weight arm and secondary arm and constructed to cause the governor weight arm upon moving a certain number of degrees to move the secondary arm a greater number of degrees.

3. In an engine governor, the combination of a rotary driving shaft, a primary arm connected with said shaft, a primary crank journal mounted on said primary arm on one side of the center of said shaft, a secondary arm pivoted on said primary crank journal, a secondary crank journal mounted on the secondary arm and capable of swinging laterally toward and from the axis of said shaft, a valve, a connection between said valve and said secondary crank journal, a governor weight arm pivotally mounted on said shaft on one side of the axis of the latter, and a link connecting said governor weight arm and said secondary crank arm, the distance from the primary crank journal to the pivotal connection between said link and the secondary arm being less than the distance from the pivotal connection of the governor weight arm and the shaft to the pivotal connection between the governor weight arm and said link.

Witness my hand this 23rd day of December, 1911.

JOHN H. WHITING.

Witnesses:
THEO. L. POPP,
ANNA HEIGIS.

Copies of this patent may be obtained for five cents each, by addressing the "Commissioner of Patents, Washington, D. C."